Patented Dec. 15, 1953

2,662,901

UNITED STATES PATENT OFFICE 2,662,901

PROCESS FOR PURIFYING PHTHALIC ANHYDRIDE

Maurice E. Bailey, Orchard Park, N. Y., assignor to Allied Chemical & Dye Corporation, New York, N. Y., a corporation of New York No Drawing. Application March 11, 1949, Serial No. 81,018

8 Claims. (Cl. 260—346.7)

This invention relates to a process for purifying phthalic anhydride to improve its color and color stability and more particularly to the purification of crude phthalic anhydride containing naphthoquinone bodies, which are colored or form colored compounds.

Phthalic anhydride as an article of commerce has numerous and varied uses, many of which require it to be substantially free of color and color-forming bodies. Such uses occur in the manufacture of light colored resins, plasticizers for clear lacquers, transparent sheeting, etc.

In the past, phthalic anhydride has been obtained primarily by catalytic air-oxidation of naphthalene vapors through the use of processes wherein the phthalic anhydride vapors produced have been condensed by cooling to temperatures not exceeding about 50° C. Crude phthalic anhydride thus obtained usually contains relatively small amounts of impurities such as naphthoquinones, especially 1,4-naphthoquinone, maleic anhydride, benzoic acid and dark colored materials. The crude phthalic anhydride produced by such prior art processes is condensed to solid deposits which are removed from condensers partly in the form of light voluminous masses of long needle-like crystals conveniently called "hay", and partly in the form of dense hard masses conveniently called "scale". Such crude phthalic anhydride is sufficiently colored to be unacceptable for many commercial uses which require a substantially colorless product, and is customarily purified by melting the "hay" and "scale" mixture and subjecting the molten material to an "ageing" treatment whereby the material is kept near its boiling temperature at atmospheric pressure until a sample, when distilled, produces a satisfactory phthalic anhydride distillate of the desired standard of freedom from color. In some unexplained manner such ageing "destroys" the color bodies or renders them non-volatile, and thereby enables the purified phthalic anhydride to be recovered thereafter by volatilization.

Recent changes to apparatus and processes to improve efficiency, facility and cost of manufacturing phthalic anhydride by catalytic oxidation of naphthalene vapors have so affected the resulting crude anhydride that it can not be purified satisfactorily by the prior art method consisting solely of the aforesaid heat treatment, i. e. ageing step, and a fractional distillation step. For example, this prior art method of purification is unsatisfactory when applied to crude phthalic anhydride made by a catalytic oxidation with an air-naphthalene vapor ratio exceeding about 30 to 1, and/or by cooling the hot gases from an oxidation, to about 65° C. or higher, that is to say, to a temperature substantially above that previously used to condense the phthalic anhydride vapors. In the case of such crude phthalic anhydride the prior art color purification treatment, while sometimes providing a good yield of purified phthalic anhydride of initially satisfactory color, fails to provide a purified product of requisite color stability, even if the heat treatment be carried out in the presence of a catalyst or a promoter such as manganese dioxide, potassium permanganate and powdered iron. Furthermore, although some catalysts, such as powdered zinc and zinc oxide, assist in obtaining a purified phthalic anhydride product of good color stability from such crude phthalic anhydride, they permit recovery of only relatively low yields of purified product, and hence their use is undesirable. Still other catalysts have been found unsatisfactory for general use, since the finally distilled phthalic anhydride obtained with their aid has a relatively low setting point, an indication that the expected "purified" anhydride contains impurities, possibly degradation products, formed during the heating treatment and distillation.

It has been discovered by the present applicant and John K. Evans that a noteworthy difference between the crude phthalic anhydrides made by the former and later processes, referred to above, is that the amount of maleic anhydride which is present as an impurity in the crude material made by the former processes is greater than that present in the crude phthalic anhydride made by the later processes. Thus, the amounts of naphthoquinone-like impurities and of maleic anhydride which are contained in a crude phthalic anhydride made according to the earlier processes are generally about equal, but in the crude phthalic anhydride made according to the later processes, the weight of naphthoquinone-like impurities is generally greater than, often about 15 times, that of the maleic anhydride. Frequently this weight-ratio of naphthoquinone-like impurities to maleic anhydride is even greater, depending on particular conditions extant during the catalytic oxidation reaction and the subsequent cooling of the resulting gases.

It was further discovered that maleic anhydride, which is a common impurity in crude phthalic anhydride made by vapor phase catalytic oxidations of napthalene, plays the surprising and important part in the reaction which is induced by "ageing," as carried out in the prior art purification of such crude products, of changing the color-forming impurities, in some manner, to render them less volatile and thus removable from the crude phthalic anhydride product. The reaction giving rise to this changing effect is not known, but it appears to involve some combination between maleic anhydride and the impurities, especially those of the naphthoquinone type. Thus, the amount of maleic anhydride impurity associated with naphthoquinone-like impurities in the crude phthalic anhydride is an important factor, which though not recognized before the aforesaid discovery, is now known to influence greatly the efficacy of the ageing step in the purification by a heat treatment and fractional distillation of crude phthalic anhydride.

It is an object of the present invention to provide an improved process for purifying crude phthalic anhydride which contains impurities of the type of naphthoquinone.

It is a further object of the invention to provide a process for purifying crude phthalic anhydride products containing a deficiency of maleic anhydride type of impurity relative to the naphthoquinone type of impurity.

It is a still further object of the invention to provide a process for purifying crude phthalic anhydride prepared by the catalytic oxidation of naphthalene vapors wherein the crude phthalic anhydride product is initially condensed at a temperature of 65° C. or higher, and which cannot be satisfactorily purified by the heretofore used simple heating or "ageing" process of the elementary crude anhydride.

These and other objects are accomplished according to the improved process of this invention wherein crude phthalic anhydride, of the character described, is heated in the molten phase in the presence of a small quantity of sodium bisulfite or equivalent, to react with the color-forming impurities present to change them to a removable form, and thereafter recovering the purified phthalic anhydride in standard manner by volatilization or the like.

The improved process according to the present invention is adapted for the purification of any crude phthalic anhydride product which contains naphthoquinones or derivatives thereof as impurities. As pointed out above, the improved method is particularly useful in purifying a crude phthalic anhydride which is prepared by catalytically oxidizing naphthalene vapors with air and recovering the crude product by the relatively newer methods of conducting the hot gases from the oxidation through a condenser wherein the gases are cooled to a temperature between about 65° and about 75° C., thereby causing the crude phthalic anhydride to deposit in the condenser as a solid, and periodically thawing the solid deposit and removing the product as a liquid from the condenser. Crude phthalic anhydride product thus prepared may contain as much as 4% or more by weight of naphthoquinone bodies and as little as 0.1% by weight and in some cases even no detectable quantities of maleic anhydride. Such crude phthalic anhydride cannot be purified by the usual heat treatment.

In carrying out the process according to this invention the crude phthalic anhydride product containing a naphthoquinone type impurity is melted or fused, and a small quantity of sodium bisulfite or equivalent is added and suitably mixed therewith. The mixture is then heated, conveniently under atmospheric refluxing conditions, to a temperature of at least about 270° C. and held above this temperature, preferably at temperatures between about 270° and about 305° C. for a sufficient length of time to permit substantially complete reaction of the colored and color-forming impurities with the sodium bisulfite or equivalent. A period of between about 2 and about 12 hours is usually sufficient.

The length of time required to achieve complete purification or the desired degree of purification may readily be determined by periodic withdrawal of samples of a thermally aged mixture, and subjecting each sample to fractional distillation to recover a representative "cut" or fraction, and then determining the color properties of the fraction as described hereinafter. The thermal ageing is complete when the fraction of purified phthalic anhydride thus obtained possesses the desired color properties.

The thermal ageing in the presence of sodium bisulfite (or equivalent thereof) is carried out at a temperature at which the crude phthalic anhydride melts to provide a molten, readily stirrable mass, and it may be performed under ordinary, reduced, or superatmospheric pressure. Preferably, the sodium bisulfite, or its equivalent, is added to the crude phthalic anhydride at a temperature not exceeding about 200° C., after which the mixture may be heated at such temperatures, or raised gradually, for example, during about 2 hours, to refluxing under ordinary pressure, i. e. about 280° C., until the desired purification is attained. The sodium bisulfite or similar assistant is advantageously employed in finely-divided form to promote intimate contact thereof with phthalic anhydride, in which it is essentially insoluble. The presence of sodium bisulfite, or like assistant, in the thermal ageing of crude phthalic anhydride products derived from naphthalene accelerates the rate of purification, and produces a distillate of purified phthalic anhydride having better color characteristics than that similarly obtained when such assistant is omitted.

The amount of purification assistant required varies according to the purity of the phthalic anhydride to be treated, the degree of purification desired, and the temperature and duration of the treatment. Preferably, the sodium bisulfite, or its equivalent, is employed in an amount ranging from about 0.2 to 1%, based on the weight of the crude phthalic anhydride charge, although other amounts may be used, if desired.

After the conversion of the colored and color-forming impurities is complete, the phthalic anhydride may be separated therefrom and recovered in conventional manner as by fractional distillation.

The colored and color-forming bodies which are primarily present in crude phthalic anhydride formed by processes of the type described above, and which are readily removed by the process of this invention, include those of the type of naphthoquinones, especially 1,4-naphthoquinone, and also derivatives and polymers of the naphthoquinones. Wherever the term "naphthoquinones" is used in the specification and claims, it is to be understood that all the compounds of the above type present in the phthalic anhydride crude are intended to be included.

In place of sodium bisulfite, an equivalent salt such as potassium bisulfite, or a salt of the group consisting of sodium and potassium, meta bisulfites, hydrosulfites and sulfoxylates may be employed. The hydrosulfites and sulfoxylates may be in the form of stabilized complexes, such as formaldehyde sulfoxylates. The sodium bisulfite or equivalent may be used alone as the only purifying assistant, or it may be used in admixture with a butene-1,4-dioic acid or anhydride thereof such as maleic anhydride, as disclosed in my copending application with another, Serial No. 15,964 filed March 19, 1948.

Commercially acceptable purified phthalic anhydride, which is substantially free of color initially and sufficiently stable on storage to resist formation of colored bodies over a period of time, has been prepared by successful application of the "ageing" and fractional distillation of crude phthalic anhydride made by the earlier processes hereinbefore noted. Such commercially acceptable purified phthalic anhydride usually exhibits an initial color of less than 40 as measured by the well known "Platinum-Cobalt" color test described below, and is characterized by a color stability which enables the purified product to be stored under atmospheric temperature conditions for several months with relatively little increase in its color. The effect of such storage can conveniently be simulated by an "accelerated ageing" treatment wherein a purified phthalic anhydride distillate is heated to an elevated temperature for several hours, for practical purposes, four hours at about 180° C. Purified phthalic anhydride, prepared and purified according to prior art practices, is usually considered acceptable in color stability if it does not attain a Platinum-Cobalt color exceeding about 55 when submitted to this practical "accelerated ageing." Crude phthalic anhydride which is prepared and recovered according to the later type processes described above, and which cannot be purified by the usual prior art heat treatments, even as modified by catalysts as described, can be purified according to the process of this invention to provide a commercially acceptable phthalic anhydride which is characterized by an initial color equal to or better than that represented by the Platinum-Cobalt Index 40, and by a color equal to or better than that of a Platinum-Cobalt Index of 55 when the purified anhydride is subjected to the "accelerated ageing" test described above.

In any case, when, in accordance with the improved process of this invention, a crude phthalic anhydride is mixed with a small amount of sodium bisulfite or equivalent and then is subjected to heat treatment and fractional distillation as described, the resulting distillate of purified phthalic anhydride has a better color stability and generally a better initial color than the purified phthalic anhydride recoverable by treating the same crude phthalic anhydride without the addition of sodium bisulfite, but otherwise in exactly the same manner.

The so-called "Platinum-Cobalt" (Pt-Co) color test referred to above comprises a comparison of the color of molten phthalic anhydride with a set of color standards wherein each color standard bears a number which is synonymous with the shade of a specific dilution of a stock aqueous solution of potassium chloroplatinate and cobalt chloride. The stock solution is prepared by adding 100 cc. of concentrated hydrochloric acid, Sp. Gr. 1.18, to a solution of 1.246 grams of potassium chloroplatinate ($K_2PtCl_6$), corresponding to 0.50 gram of platinum, and 1.00 gram of cobalt chloride hexahydrate ($CoCl_2.6H_2O$), corresponding to 0.25 gram of cobalt, in distilled water and diluting the resulting solution with distilled water to a volume of one liter. The stock solution thus prepared is given a color number of 500 and the remaining color numbers of the scale are ascribed to solutions obtained by specific degrees of dilution of the stock solution as follows:

| Color Number | Dilution (parts by volume of distilled water per part of stock solution) |
|---|---|
| 10 | 49 |
| 20 | 24 |
| 40 | 11.50 |
| 50 | 9.00 |
| 60 | 7.30 |
| 80 | 5.25 |
| 100 | 4.00 |
| 150 | 2.33 |
| 200 | 1.50 |
| 300 | 0.67 |
| 400 | 0.25 |
| 500 | 0.00 |

To determine the color number of a purified phthalic anhydride, a molten sample of the latter is compared, under substantially identical conditions, with standard solutions which correspond to those identified by the numbers in the foregoing color scale; the number of the solution whose color is most closely approximated by the color of the molten anhydride is said to be the color number of the latter. Or, the evaluation may be carried out through the aid of so-called "Hazen" Platinum-Cobalt and calomel solution standards described under the heading "Parlin Color Standards" on page 71 of "Physical and Chemical Examination of Paints, Varnishes, Lacquers and Colors" by Henry A. Gardner, 9th edition (1939).

The yields of purified phthalic anhydride obtained in the purification process of this invention are comparable to those obtained in the most satisfactory prior art processes and usually amount to between about 70% and 90% or higher based on the weight of crude phthalic anhydride processed, the major portion of the yields being obtained in a "main fraction," further portions being recoverable by further processing of the "lights" and "tails" fractions.

As brought out above, sodium bisulfite or equivalent may be used advantageously in combination with a butene-1,4-dioic acid or anhydride such as maleic anhydride.

When sodium bisulfite is employed in conjunction with butene-1,4-dioic acids, it accelerates the rates at which naphthoquinone is changed and eliminated, and consequently accelerates the rate at which phthalic anhydride is purified. It also appears to provide a somewhat more complete purification of the phthalic anhydride than is obtainable by the use of sodium bisulfite or butene-1,4-dioic acids or anhydrides alone. Moreover, sodium bisulfite has the effect of destroying excess maleic anhydride, and thus serves to obviate the necessity for separating excess of this purifying agent by fractional distillation. As illustrated in Example 2, it is preferred to withhold addition of the sulfite compound for some time, say 1 to 2 hours after the addition of butene- 1,4-dioic acid or anhydride is complete while maintaining the temperature of the mixture at about 180° C. so as to minimize the possibility of lowering the effectiveness of the butene-1,4-dioic acid or anhydride.

The invention is not limited to the purification of crude phthalic anhydride products of the type illustrated in the examples; it may be applied to improve the color characteristics of any phthalic anhydride which contains naphthoquinone impurities, and which cannot be purified satisfactorily by conventional heat-ageing followed by fractional distillation.

The following specific examples further illustrate the invention. Parts are by weight.

EXAMPLE 1

500 parts of crude phthalic anhydride were charged into a 1-liter glass still provided with a glass reflux column 18" long and 1" in diameter, packed with ¼" x ¼" glass rings. The crude phthalic anhydride had a setting point of 127.5° C. and was obtained by oxidizing naphthalene vapors with air in the presence of a catalyst comprising a vanadium oxide, passing the gaseous reaction products through a vapor cooler to a condenser, cooling the gases in said condenser to about 75° C. so as to condense substantially all of the phthalic anhydride contained in said gases as a solid, and periodically thawing and removing the phthalic anhydride deposited in the condenser while diverting the gas stream to a second condenser. The still contents were then heated to about 180° C., and 2.5 parts of powdered sodium bisulfite were added. The agitated molten mixture was heated to boiling during about 1–2 hours under atmospheric pressure (270°–280° C.) and refluxed for about 8 hours, and thereafter distilled through the column under an absolute pressure of 15–25 mm. of mercury. The distillate was collected in 3 fractions: (a) an initial or "lights" cut amounting to about 10% by weight of the distilland; (b) a second or main fraction amounting to about 70% of the distilland; and (c) a final or "tails" fraction representing the balance. The color of a molten sample of the main fraction thus obtained was determined by reference to the Pt-Co scale of color standards. The sample was then heated to 180° C. for 4 hours, and its color again noted.

A control run was similarly made with the same lot of crude phthalic anhydride except that the addition of sodium bisulfite was omitted.

As shown in Table I, the main fraction obtained when sodium bisulfite was employed possessed a Pt-Co color of 20 initially, and a Pt-Co color of 30 after 4 hours at 180° C., whereas the main fraction obtained when sodium bisulfite was omitted possessed a Pt-Co color of 50 initially and a Pt-Co color of 100 after 4 hours at 180° C.

Table I

|  | 0.5% NaHSO₃ | Without NaHSO₃ |
|---|---|---|
| Total distillate yield, percent | 88.1 | 88.5 |
| S. P.¹ of crude phthalic anhydride °C | 127.5 | 127.5 |
| S. P. of lights fraction °C | 129.0 | 130.5 |
| S. P. of main fraction °C | 130.8 | 131.1 |
| S. P. of tail fraction °C | 130.5 | 130.7 |
| Initial color of lights fraction | 35 | 125 |
| Initial color of main fraction | 20 | 50 |
| Initial color of tail fraction | 500 | 500 |
| Color of main fraction after 4 hours at 180° C | 30 | 100 |

¹ Setting point.

EXAMPLE 2

500 parts of the same lot of crude phthalic anhydride that was used in Example 1 were charged to glass still described above. The still contents were heated to about 180° C., and 2.5 parts of maleic anhydride were added. The agitated mixture was further heated for about 1 hour at 180° C. and 2.5 parts of powdered sodium bisulfite were introduced. The still contents were then heated to boiling (275°–285° C.), and refluxed for about 8 hours. The still charge was fractionally distilled in the manner described in the preceding example.

The purified phthalic anhydride thus obtained possessed better color and color stability than that similarly obtained by (a) omitting the use of both sodium bisulfite and maleic anhydride, (b) by using 0.5% of sodium bisulfite only, or (c) by using 0.5% of maleic anhydride alone, as shown in Table II below:

Table II

COLOR AND PURITY CHARACTERISTICS OF PHTHALIC ANHYDRIDE PURIFIED WITH NaHSO₃ ALONE, WITH MALEIC ANHYDRIDE (C₄H₂O₃) AND WITH A MIXTURE OF NaHSO₃ AND MALEIC ANHYDRIDE

|  | With 0.5% NaHSO₃ plus 0.5% C₄H₂O₃ | Without either C₄H₂O₃ or NaHSO₃ | With 0.5% NaHSO₃ only | With 0.5% C₄H₂O₃ only |
|---|---|---|---|---|
| Total yield of distillate (percent) | 88.4 | 88.5 | 88.1 | 92.5 |
| S. P. of crude phthalic anhydride °C | 127.5 | 127.5 | 127.5 | 127.5 |
| S. P. of lights fraction °C | 129.5 | 130.5 | 129.0 | 130.6 |
| S. P. of main fraction °C | 131.0 | 131.1 | 130.8 | 130.8 |
| S. P. of tail fraction °C | 131.0 | 130.7 | 130.5 | 130.9 |
| Initial color of lights fraction | 20 | 125 | 35 | 500 |
| Initial color of main fraction | 5 | 50 | 20 | 5 |
| Initial color of tail fraction | 5 | 500 | 500 | 500 |
| Color of main fraction after 4 hours at 180° C | 10 | 100 | 30 | 30 |

EXAMPLE 3

5000 parts of crude phthalic anhydride (obtained as a mixture of "hay" and "scale" from an atmospherically cooled condenser house, in which gases obtained by catalytically oxidizing naphthalene vapors with air were cooled to about 40°–50° C. to condense most of their content of phthalic anhydride) were heated to 180° C. in an iron still provided with an iron reflux column 18" long and 2" in diameter packed with ¼" x ¼" glass rings. 25 parts of powdered sodium bisulfite were stirred into the molten charge at 180° C. The mixture was then heated under atmospheric pressure during 3–4 hours to refluxing (about 280° C.), and refluxed for 8 hours. The mass was then fractionally distilled under an absolute pressure of 15–25 mm. of mercury, and fractions, each of which corresponded to 10% of the weight of the crude phthalic anhydride were collected separately until 86% of the charge had been recovered as distillate, which corresponds approximately to the recovery obtained in normal commercial operations. The color of each fraction was determined immediately and after 4 hours heating at 180° C., as above.

A similar run was made in like manner except that 12.5 parts of maleic anhydride were added about 1 hour before the sodium bisulfite was introduced.

A control run was also made in similar manner by omitting the addition of sodium bisulfite and maleic anhydride.

As shown in Table III below, all fractions of purified phthalic anhydride obtained by employing sodium bisulfite were lighter in color initially as well as after 4 hours at 180° C. than corresponding fractions obtained when the sodium bisulfite was omitted, the results obtained by employing sodium bisulfite together with maleic anhydride being superior to those obtained with sodium bisulfite alone.

*Table III*

COLOR AND SUCCESSIVE ABSTRACTIONS OF PURIFIED PHTHALIC ANHYDRIDE OBTAINED USING NO PURIFICATION AGENT, USING NaHSO₃, AND USING NaHSO₃ WITH MALEIC ANHYDRIDE

| Purifying agent added | Distillate fraction (total recovery=86%) of crude phthalic anhydride | | | | | | | | | | | | | | | | | |
|---|---|---|---|---|---|---|---|---|---|---|---|---|---|---|---|---|---|---|
| | 0–10% | | 10–20% | | 20–30% | | 30–40% | | 40–50% | | 50–60% | | 60–70% | | 70–80% | | 80–86% | |
| | Color | S. P. | Color | S. P. | Color | S. P. | Color | S. P. | Color | S. P. | Color | S. P. | Color | S. P. | Color | S. P. | Color | S. P. |
| None | 90–500 | 130.9 | 60–100 | 131.1 | 60–100 | 131.2 | 50–90 | 131.2 | 45–90 | 131.2 | 55–100 | 131.3 | 85–125 | 131.2 | 70–100 | 131.2 | 60–90 | 131.0 |
| NaHSO₃ | 55–150 | 130.7 | 10–55 | 130.7 | 5–45 | 130.8 | 10–40 | 130.8 | 20–50 | 130.9 | 20–45 | 130.9 | 20–50 | 131.2 | 30–50 | 130.8 | 30–40 | 131.0 |
| NaHSO₃ and maleic anhydride | 20–50 | 130.3 | 5–10 | 130.7 | 5–10 | 130.9 | 5–10 | 131.1 | 5–10 | 131.0 | 5–10 | 131.0 | 5–10 | 130.9 | 5–10 | 131.0 | 5–15 | 131.0 |

Colors are expressed in terms of the Pt-Co scale; the first number represents the initial color, whereas the second number denotes the color after 4 hours at 180° C.

While the above describes the preferred embodiments of my invention, it will be understood that departures may be made therefrom within the scope of the specification and claims.

I claim:

1. A process for the purification of crude phthalic anhydride obtained by catalytic oxidation of naphthalene vapors and containing naphthoquinone type impurities, which comprises heating the crude phthalic anhydride in the molten phase in the presence of a small quantity of an alkali metal salt of the group consisting of sodium and potassium bisulfites, meta bisulfites, hydrosulfites and sulfoxylates, and thereafter recovering the purified phthalic anhydride by volatilization.

2. A process for the purification of crude phthalic anhydride obtained by catalytic oxidation of naphthalene vapors and containing naphthoquinone type impurities, which comprises heating the crude phthalic anhydride for a period between about 2 and about 12 hours at a temperature between about 200° C. and about 305° C. in the presence of between about 0.2 and about 1%, based on the weight of the crude phthalic anhydride, of an alkali metal salt of the group consisting of sodium and potassium bisulfites, meta bisulfites, hydrosulfites and sulfoxylates, and thereafter recovering the purified phthalic anhydride by volatilization.

3. A process for the purification of crude phthalic anhydride obtained by catalytic oxidation of naphthalene vapors and containing naphthoquinone type impurities, which comprises heating the crude phthalic anhydride in the molten phase in the presence of a small quantity of sodium bisulfite, and thereafter recovering the purified phthalic anhydride by volatilization.

4. A process for the purification of crude phthalic anhydride obtained by catalytic oxidation of naphthalene vapors and containing naphthoquinone type impurities, which comprises heating the crude phthalic anhydride in the molten phase in the presence of between about 0.2 and about 1% of sodium bisulfite, based on the weight of the crude phthalic anhydride, and thereafter recovering the purified phthalic anhydride by volatilization.

5. A process for the purification of crude phthalic anhydride obtained by catalytic oxidation of naphthalene vapors and containing naphthoquinone type impurities, which comprises heating the crude phthalic anhydride for a period between about 2 and about 12 hours at a temperature between about 200° C. and about 305° C. in the presence of between about 0.2 and about 1% sodium bisulfite, based on the weight of the crude phthalic anhydride, and thereafter recovering the purified phthalic anhydride by volatilization.

6. A process for the purification of crude phthalic anhydride obtained by catalytic oxidation of naphthalene vapors and containing naphthoquinone type impurities, which comprises melting the crude phthalic anhydride, adding thereto a quantity of sodium bisulfite, equal to between about 0.2 and about 1% based on the weight of the crude phthalic anhydride, heating the mixture at a temperature between about 200° C. and about 305° C., and thereafter recovering the purified phthalic anhydride by volatilization.

7. A process for the purification of crude phthalic anhydride obtained by catalytic oxidation of naphthalene vapors and containing naphthoquinone type impurities, which comprises melting the crude phthalic anhydride, adding thereto a quantity of sodium bisulfite equal to between about 0.2 and about 1% of the weight of the crude phthalic anhydride, heating the mixture thus obtained under refluxing conditions at a temperature between about 275° C. and about 285° C. for a period of between about 2 and about 12 hours, and thereafter recovering the purified phthalic anhydride by volatilization.

8. A process for purification of crude phthalic anhydride obtained by catalytic air oxidation of naphthalene vapors and cooling of hot gases from the oxidation to a temperature not below about 65° C., said anhydride containing naphthoquinone type impurities, which process comprises heating the crude phthalic anhydride to about 180° C., adding thereto between about 0.2 and about 1% of sodium bisulfite, based on the weight of the phthalic anhydride, continuing the heating at said temperature for a period between about 1 and about 2 hours under atmospheric pressure, thereafter continuing the heating under refluxing conditions for an additional period of between about 8 and about 9 hours, and thereafter recovering the purified phthalic anhydride by volatilization.

MAURICE E. BAILEY.

References Cited in the file of this patent

UNITED STATES PATENTS

| Number | Name | Date |
|---|---|---|
| 1,755,242 | Conover | Apr. 22, 1930 |
| 1,897,110 | Bowers | Feb. 14, 1933 |
| 2,059,466 | Limpach | Nov. 3, 1936 |